United States Patent Office 2,937,160
Patented May 17, 1960

2,937,160

PREPARATION OF POLYESTERS USING COBALTOUS CHLORIDE AS CATALYST

John K. Sullivan, Akron, Ohio, assignor to The Goodyear Tire & Rubber Company, Akron, Ohio, a corporation of Ohio No Drawing. Application March 26, 1954
Serial No. 419,105

13 Claims. (Cl. 260—75)

This invention relates to the preparation of polymeric glycol esters of terephthalic and isophthalic acids. More particularly this invention relates to an improvement in the method of preparing such superpolyesters by the alcoholysis of esters of these phthalic acids with a glycol and the subsequent polymerization of these glycol phthalates to high polymeric linear polyesters.

In the preparation of linear superpolyesters, one of the most satisfactory methods from the standpoint of simplicity of reaction and economy of operation has been the ester interchange method in which the esters of the acids are reacted with a glycol to form the diglycol ester of the acid or a low molecular weight polymeric polyester which is then polymerized to a high molecular weight polymeric polyester by a condensation reaction with splitting out of glycol. This process, however, has not been entirely satisfactory because the initial ester interchange reaction is slow and because many of the materials that catalyze this reaction are not effective as catalysts for the subsequent condensation reaction.

Heretofore various materials have been proposed as catalysts for the ester interchange reaction between the esters of dicarboxylic acids and glycols and for the subsequent polymerization or condensation reaction. Metals in the form of powder, chips, ribbon or wire have been suggested, as have surface catalysts such as broken glass or silica gel. The more successful of the catalysts used in the past, however, have been the alkaline materials such as the alkali metal and alkaline earth metal alcoholates, the alkali metal carbonates, or other alkaline reacting salts, alkaline earth oxides, and litharge.

Many of these materials are effective catalysts for the initial simple ester interchange, and some of them catalyze the condensation reaction. However, many of the substances that catalyze the condensation reaction carry the polymerization only to a low degree or they do not promote the reaction effectively enough to give reaction rates acceptable for a commercial process.

According to the present invention, it has been found that cobaltous chloride catalyzes the ester interchange between glycols and terephthalate esters or isophthalate esters or mixtures of these esters and greatly accelerates the subsequent polymerization of the product and permits the formation in relatively short reaction times of polymers of high molecular weight which may be readily processed to form products having excellent properties.

A particularly valuable advantage obtained in using cobaltous chloride, in addition to its efficacious action as a catalyst, is that cobaltous chloride imparts a light bluish-violet color to the polymers. In relatively thick sections the materials are a beautiful shade of blue. These same materials, when formed into products having a very thin cross section, appear to the human eye to be water white. Consequently water white thin films having a high clarity and brilliant luster can be formed from these cobaltous chloride-catalyzed polymers.

The terephthalate or isophthalate ester or a mixture thereof can be reacted with a glycol and the resultant glycol ester condensed to form a polymer, both stages of the reaction being carried out in the presence of cobaltous chloride. However, if desired, the bis glycol ester may be prepared by any other suitable method, such as by reacting the sodium or potassium salt of the acid with ethylene chlorohydrin, or by reacting the acid with a large excess of the glycol, or by glycolysis using some catalyst which is a catalyst for the ester interchange but which is not a catalyst for the polymerization reaction. The bis ester or a low molecular weight polymer thereof can then be polymerized according to the usual known techniques using cobaltous chloride as the catalyst.

The following example illustrates the invention and how it may be carried out:

Example

Thirteen and four-tenths parts of ethylene glycol and 13.4 parts of a 75/25 dimethyl terephthalate/dimethyl isophthalate mixture to which 0.0073 part of cobaltous chloride hexahydrate (equivalent to 0.03% anhydrous cobaltous chloride based on the total weight of dimethyl terephthalate and dimethyl isophthalate) has been added were placed in a glass tube having an inside diameter of 25 millimeters. The mixture of polyester-forming reactants was heated to 197° C. under nitrogen gas at atmospheric pressure. A slow stream of nitrogen was passed through the mixture at the rate of approximately 100 bubbles per minute. Stirring was accomplished by mechanically rotating the nitrogen inlet tube which was fitted with three pairs of blades. The alcoholysis was carried substantially to completion as determined by the recovery of approximately 90% of the calculated amount of methanol. The time required for the alcoholysis reaction was three hours. At the conclusion of the alcoholysis the pressure was gradually reduced to 0.1 millimeter of mercury and the unreacted glycol distilled off. By controlling the rate of flow of nitrogen into the evacuated system, the pressure was controlled and maintained at 1.0 millimeter of mercury. After 5.5 hours of condensation at 260° C. and 1 millimeter of mercury a 75/25 ethylene terephthalate/ethylene isophthalate copolymer having a melt viscosity at 280° C. of 12,930 poises was obtained.

While the practice of the invention has been illustrated with particular respect to the 75/25 ethylene terephthalate/ethylene isophthalate copolymer, ethylene terephthalate, ethylene isophthalate and copolymers containing any other ratio of ethylene terephthalate to ethylene isophthalate can similarly be made using cobaltous chloride as catalyst for the ester interchange or polymerization reaction, by adjusting the proportions of the starting materials.

In the practice of the invention, the preparation of the glycol ester and its subsequent polymerization is, in general, carried out in accordance with the usual, known techniques. Thus, the reaction is preferably carried out in the absence of oxygen, generally in an atmosphere of an inert gas such as nitrogen or the like, in order to lessen darkening and to make it possible to obtain a high molecular weight pale or colorless product. Bubbling the inert gas through the reacting mixture serves the added functions of agitation and of expediting the removal of volatile components formed by the reaction.

In the example above cobaltous chloride used was in the form of its hexahydrate. It can also be used in the form of some other hydrate or in the anhydrous state. Where concentrations are given herein, the figures refer to the anhydrous form, unless otherwise indicated, it being understood that an equivalent amount of a cobaltous chloride hydrate can be used to carry out the practice of this invention.

The amount of cobaltous chloride used may be varied over wide concentrations. As is usual with catalysts, the amount will ordinarily be relatively small. As a general rule, the amount will be within the range of from 0.01 to 0.30 percent, based on the dialkyl phthalate. The preferred range is 0.01 to 0.05 percent, based on the dialkyl phthalate, to give a satisfactory reaction rate and a product of suitable viscosity and color.

The example given illustrates the invention particularly with respect to the dimethyl esters and ethylene glycol. The invention will also work effectively with other esters of the phthalic acids such as the ethyl, propyl, butyl, and phenyl esters. Other glycols, such as the propylene glycols and the butylene glycols may also be used although ethylene glycol is preferred because of its low cost and ready availability.

While certain representative embodiments and details have been shown for the purpose of illustrating the invention, it will be apparent to those skilled in this art that various changes and modifications may be made therein without departing from the spirit or scope of the invention.

I claim:

1. In a process for preparing a polyester by the self-condensation, with the removal of glycol, of a bis glycol ester of at least one acid selected from the group consisting of terephthalic acid and isophthalic acid, the improvement which comprises carrying out said condensation in the presence of a catalytic amount of cobaltous chloride.

2. A process according to claim 1 in which the cobaltous chloride is used in amount of 0.01 to 0.05% by weight of the weight of the esters of terephthalic acid and isophthalic acid and calculated as anhydrous cobaltous chloride.

3. In a process for preparing a polyester by subjecting at least one bis ester selected from the group consisting of methyl, ethyl, propyl, butyl, and phenyl esters of terephthalic and isophthalic acids to alcoholysis in the presence of an excess of a glycol and thereafter subjecting the bis glycol ester thus formed to self-condensation, with the removal of glycol, the improvement which comprises carrying out both the alcoholysis and condensation in the presence of a catalytic amount of cobaltous chloride.

4. A process according to claim 3 in which the cobaltous chloride is used in amount of 0.01 to 0.05% by weight of the weight of the esters of terephthalic acid and isophthalic acid and calculated as anhydrous cobaltous chloride.

5. In a process for preparing a polyester by the self-condensation, with the removal of ethylene glycol, of a bis ethylene glycol ester of at least one acid selected from the group consisting of terephthalic acid and isophthalic acid, the improvement which comprises carrying out said condensation in the presence of a catalytic amount of cobaltous chloride.

6. A process according to claim 5 in which the cobaltous chloride is used in amount of 0.01 to 0.05% by weight of the weight of the esters of terephthalic acid and isophthalic acid and calculated as anhydrous cobaltous chloride.

7. In a process for preparing a polyester by subjecting at least one bis ester selected from the group consisting of methyl, ethyl, propyl, butyl, and phenyl esters of terephthalic and isophthalic acids to alcoholysis in the presence of an excess of ethylene glycol and thereafter subjecting the bis ethylene glycol ester thus formed to self-condensation, with the removal of ethylene glycol, the improvement which comprises carrying out both the alcoholysis and condensation in the presence of a catalytic amount of cobaltous chloride.

8. A process according to claim 7 in which the cobaltous chloride is used in amount of 0.01 to 0.05% by weight of the weight of the esters of terephthalic acid and isophthalic acid and calculated as anhydrous cobaltous chloride.

9. In a process for preparing a polyester by the self-condensation, with the removal of ethylene glycol, of a bis ethylene glycol ester of terephthalic acid, the improvement which comprises carrying out said condensation in the presence of a catalytic amount of cobaltous chloride.

10. In a process for preparing a polyester by the self-condensation, with the removal of ethylene glycol, of a bis ethylene glycol ester of isophthalic acid, the improvement which comprises carrying out said condensation in the presence of a catalytic amount of cobaltous chloride.

11. In a process for preparing a copolyester by the self-condensation, with the removal of ethylene glycol, of a mixture of bis ethylene glycol terephthalate and bis ethylene glycol isophthalate, the improvement which comprises carrying out said condensation in the presence of a catalytic amount of cobaltous chloride.

12. In a process for preparing a high molecular weight polyester by the self-condensation, with the removal of ethylene glycol, of a low molecular weight ethylene glycol polyester of at least one acid selected from the group consisting of terephthalic and isophthalic acid, the improvement which comprises carrying out said condensation in the presence of a catalytic amount of cobaltous chloride.

13. In a process for preparing a linear superpolyester by subjecting at least one bis ester selected from the group consisting of methyl, ethyl, propyl, butyl, and phenyl esters of terephthalic and isophthalic acids to alcoholysis in the presence of an excess of a glycol and thereafter subjecting the bis glycol ester thus formed to self-condensation with the removal of glycol, the improvement which comprises carrying out both the alcoholysis and condensation in an inert atmosphere in the presence of from 0.01 to 0.30 percent by weight of cobaltous chloride based on the weight of the esters of terephthalic and isophthalic acid and calculated as anhydrous cobaltous chloride.

References Cited in the file of this patent

UNITED STATES PATENTS

| | | |
|---|---|---|
| 2,465,319 | Whinfield et al. | Mar. 22, 1949 |
| 2,641,591 | Hofrichter | June 9, 1953 |